United States Patent

[11] 3,588,455

[72] Inventor Rudolf Ramstetter
Starnberg Am See, Germany
[21] Appl. No. 667,389
[22] Filed Sept. 13, 1967
[45] Patented June 28, 1971
[73] Assignee Polycontact AG
Chur(Graubunden), Switzerland

[54] EMBOSSED RECORD CARD
8 Claims, 9 Drawing Figs.

[52] U.S. Cl. .......... 235/61.12R
[51] Int. Cl. .......... G06k 19/00
[50] Field of Search .......... 235/61.12, 61.7 (B); 264/293, 93; 340/149 (A)

[56] References Cited

UNITED STATES PATENTS

| | | | |
|---|---|---|---|
| 2,535,125 | 12/1950 | Ferry | 235/61.12 |
| 2,967,916 | 1/1961 | Williams | 340/149(A)X |
| 3,048,097 | 8/1962 | Miller | 235/61.7(B) |
| 3,059,070 | 10/1962 | Noregaard | 340/149(A)UX |
| 2,207,379 | 7/1940 | Korber | 235/61.12 |
| 3,096,432 | 7/1963 | Wunderlich et al. | 235/61.12 |

OTHER REFERENCES

Ramstetter, Auslegeschrift No. 1,115,813, 10/1961 West Germany KI 21c 46/33

*Primary Examiner*—Maynard R. Wilbur
*Assistant Examiner*—Thomas J. Sloyan
*Attorney*—Edwin E. Greigg

ABSTRACT: A record card having a plurality of rows each formed by spaced projections extending above one face of the card; with each projection there is aligned, on the other face of the card, a depression or cavity having the same sectional area as the projection; the record card is encoded by punching out the appropriate projections with a die introduced through said cavities.

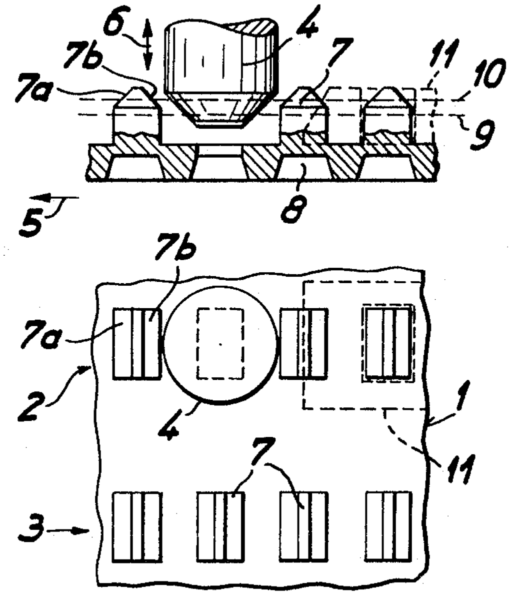
Fig.1, Fig.2
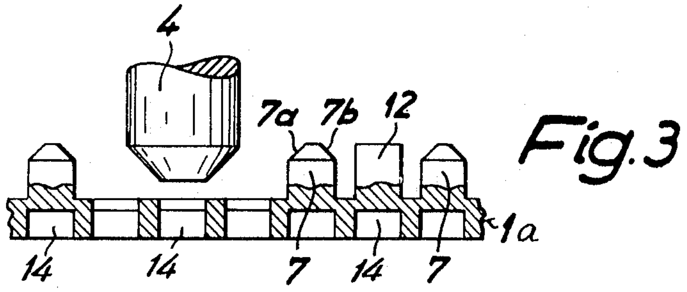
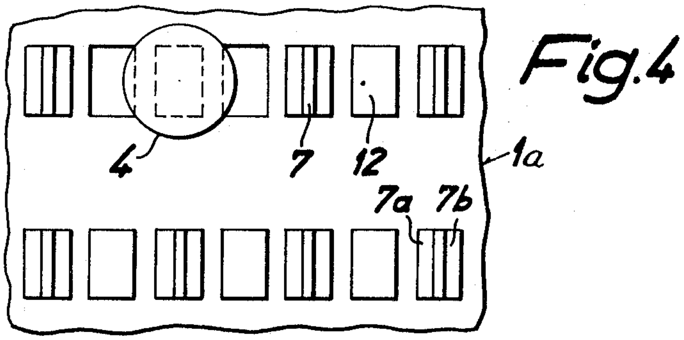
Inventor
Rudolf Ramstetter
by
Edwin E. Greigg Inventor
Rudolf Ramstetter
by
Edwin E. Greigg

EMBOSSED RECORD CARD

BACKGROUND OF THE INVENTION

Planar record cards into which holes or slots are punched according to a predetermined program are well known and widely used. The advantage of this simplest type of record cards lies in the fact that the encoding of the entire card may be performed in a single operation with a simple tool. It is a disadvantage of such cards, however, that, depending on the program, in many cases long, coherent slots have to be punched extending over adjacent locations which unfavorably affects the strength and particularly the bending strength or form stability of the card rendering a repeated use thereof exceedingly difficult.

In order to obviate this disadvantage a second group of record cards have been marketed which are provided with parallel rows projecting beyond the plane of the card. The encoding of such cards is performed by cutting away from the rows, down to the plane of the card, portions of different lengths in accordance with the program. Thus, these cards retain their strength even if row portions are removed over several adjacent positions.

There are known record cards which on one face, in addition to parallel arranged encoded contact rows, have an embossed toothed rack for cooperating with the advancing mechanism of the card during operation.

In a known similar card the toothed rack for the advance of the card is pressed into the back of the card. A modification of such a card resides in the provision of a duplication of the parallel extending encoded rows on the back side of the card in order to make possible the observation of the card reading operation.

There are further known record cards wherein the projecting rows are provided with spaced notches and the material may be removed from between two notches to obtain, according to the programming, projecting sections of different lengths. Projecting rows are provided on both sides of the card so that several programs may be encoded thereon.

Other record cards are known wherein between continuous rows that project from the plane of the card there are provided series of holes into which control plugs of different lengths are inserted.

The above-discussed group of cards, in which the rows project beyond the surface thereof, have sufficient strength and consequently may be often reused. They all have, however, a serious disadvantage in that the encoding is very circumstantial and time consuming since the desired portions of the protruding rows cannot be removed with simple means and in a single operation for the entire card. The encoding has to be performed perpendicular to the plane of the card so that only a single section of a row or, at best, only one single row may be simultaneously encoded. In order to perform a more complex encoding, a plurality of operations is necessary.

SUMMARY AND ADVANTAGES OF THE INVENTION

It is an object of the invention to provide an improved record card which, independently of the encoded information, maintains a superior strength and form stability, and, at the same time, may be encoded in a single operation with simple tools. Thus, it is the object of the invention to unite the advantages of the two above-noted card groups while eliminating their disadvantages.

Briefly stated, according to the invention, there is provided a record card having a plurality of rows projecting beyond one face of the card and formed by spaced individual projections, while the other face of the card carries cavities, one aligned with each projection along a line perpendicular to the plane of the card and having a base configuration identical to the base section of the projection.

The above-outlined novel record card is encoded simply by punching out the desired projections with a punching die from that side of the card where the cavities are disposed while the cavities associated with the projections provide a positive guidance for the die. Thus the record card, according to the invention, is, on the one hand, encoded in a single operation by means of a simple punching apparatus and, on the other hand, even if all projections in adjacent rows are removed, retains its form stability since there will be no coherent openings but merely a grid of a series of spaced holes.

A further advantage of the novel record card resides in the fact that an already encoded card may be corrected or complemented by the insertion of pluglike parts into the individual holes formed by the removal of the individual protrusions.

BRIEF DESCRIPTION OF THE DRAWINGS

FIG. 1 is a fragmentary sectional elevational view of one embodiment of the invention shown with a sensor head;

FIG. 2 is a plan view of the same embodiment;

FIG. 3 is a fragmentary sectional elevational view of another embodiment;

FIG. 4 is a plan view of the same embodiment;

DESCRIPTION OF THE EMBODIMENTS

Figure 5:
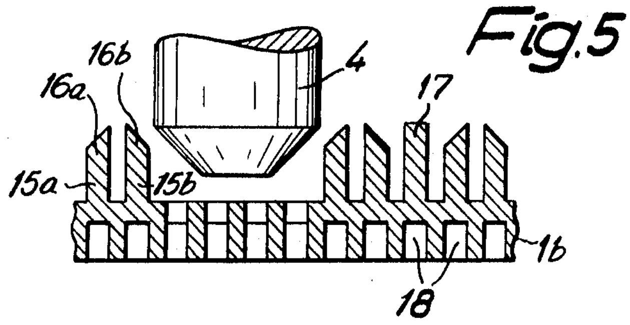
FIG. 5 is a fragmentary sectional elevational view of a further embodiment of the invention.

Turning now to FIGS. 1 and 2, there is shown a fragment of a record card 1 having a plurality of parallel rows 2 and 3, each of which is associated with a sensor head 4 (only one shown). The direction of advance of the card 1 is designated by arrow 5, while the direction of reciprocating movement of sensor 4 is indicated by arrow 6. Sensor heads 4 serve to directly actuate the switching elements (not shown) associated with the respective rows.

The rows 2 and 3 are formed by spaced, rigid projections 7 having at either side of their upper end upwardly converging cam faces **7*a*, 7*b***.

The reverse side of card 1 is provided with a plurality of outwardly flared cavities 8 each being aligned with a projection 7 along lines perpendicular to the plane of card 1 and each having a base outline substantially identical to and aligned with the base contour of each projection. Stated in different terms, each projection and its associated cavity are disposed on reverse faces of the record card. The solid base of each cavity is spaced from the plane of that card face from which the associated projection rises. Thus, said plane is disposed between the projection and the solid base of the associated cavity.

The encoding of record card 1 is performed by individually punching out projections 7 in order to obtain the desired profile for the rows 2 and 3. In carrying out this punching operation, which may be performed for the entire card in a single simultaneous step, the punch dies (not shown) are introduced from the back side of card 1 through the cavities 8. Due to the flared configuration of cavities 8, the punch dies are guided positively within each cavity to ensure a desired centerized position with respect to each projection.

During the reading operation, the sensor 4 is guided over the projections 7 as the card 1 is intermittently advanced in the direction of arrow 5. When the sensor 4 reaches a location where a projection 7 is missing, it will drop to level 9 actuating the switching element associated with that location. As the card 1 is further advanced, the sensor 4, urged by the first projection 7 following the gap, is lifted back to level 10 whereby the switching element is again actuated. Since the sensor 4 drops only to a very small extent between two projections 7 when no projection is missing therebetween, it will not drop as low as level 9 and consequently the switching position corresponding to the upper level 10 will be securely maintained until the sensor 4 reaches another location where a projection 7 has been punched out.

In order to prevent even the smallest drop of sensor 4 between two immediately adjacent projections 7, the latter may be provided with an insert 11 (shown in broken lines in FIGS. 1 and 2) having openings conforming to the width of projections 7 and having an upper face which is substantially coplanar with the upper face of projections 7.

Turning now to FIGS. 3 and 4, there is shown a further embodiment of the invention wherein projections 7 alternate with intermediate projections 12 of the same height. Each projection 7, as in the previously described embodiments, is provided with cam faces 7*a*, 7*b* and is associated with an aligned cavity 14. Similarly to projections 7, with each intermediate projection 12 there is associated at the backside of the card 1*a* a cavity 14. During the encoding operation, with each selected projection 7 the two adjacent intermediate projections 12 are also punched out. Thus, it is seen that while maintaining the dimensions and spacings of projecting elements, the length of the advancing steps during the reading operation is doubled.

The width of the upper face of the intermediate projections 12 is selected so that the sensor 4 maintains its upper position (corresponding to level 10 in FIG. 1) between two subsequent projections 7.

A further embodiment is shown in FIG. 5 wherein one single information bit is formed by a pair of projections 15*a*, 15*b*, each provided with oppositely directed cam faces 16*a*, 16*b*. Between two pairs of projections 15*a*, 15*b* there is disposed an intermediate projection 17 for a purpose similar to that described in connection with the embodiment shown in FIGS. 3 and 4. To each projecting element, that is, projections 15*a*, 15*b* and intermediate projections 17, there belongs, on the rear face of the record card 1*b*, an aligned cavity 18.

Figure 6:
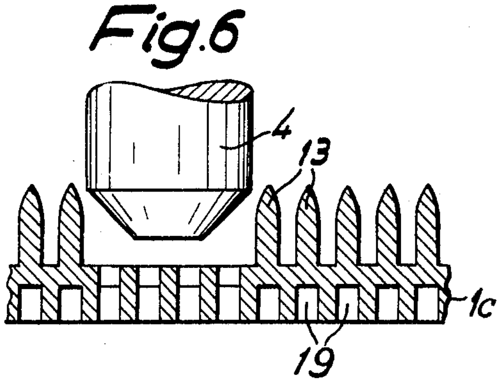
FIGS. 6 and 7 are fragmentary sectional elevational views of still a further embodiment of the invention showing the sensor head in different positions.
Figure 7:
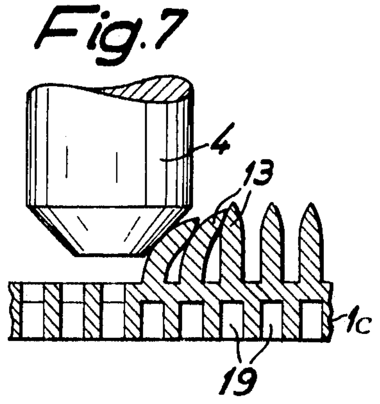

Turning now to FIGS. 6 and 7, there is shown still another embodiment of record card 1*c*, wherein the projections 13, as opposed to the rigid projections of the precedingly described embodiments, are adapted to elastically deform under the pressure of sensor head 4 and thereby form a lifting cam face therefor. For a single information bit four projections 13 are punched out by means of dies penetrating through cavities 19. This embodiment has the advantage that the projections 13 may be disposed very close together which renders the card adapted for a continuous feed. This arrangement of the projections makes possible, on the one hand, a digital encoding without long coherent holes despite the density of the projections and, on the other hand, makes possible an analog reading operation.

Figure 8:
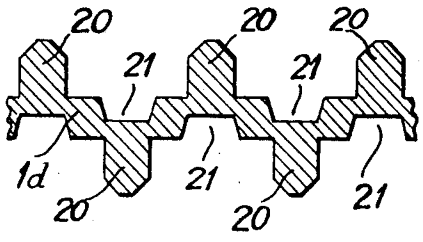
FIG. 8 is a fragmentary sectional elevational view of still another embodiment.

Still another embodiment is illustrated in FIG. 8, wherein the projections 20 and cavities 21 are disposed on both sides of the record card 1*d*. On each side of the card projections 20 and cavities 21 alternate and are arranged in such a manner that each cavity 21 on one face of the card is aligned with a projection 20 on the other face thereof.

Figure 9:
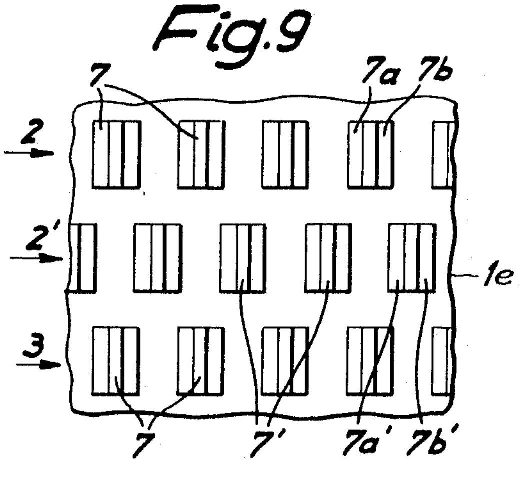
FIG. 9 is a fragmentary plan view of still a further embodiment.

Still another embodiment is shown in FIG. 9, wherein between the tow rows 2 and 3 on record care 1*e*, there is provided a third parallel row 2′, the projections 7′ which are staggered with respect to those forming rows 2 and 3 and are provided with cam faces 7*a*′ and 7*b*′. By arranging the projections in successive rows in a staggered manner the length of steps during the reading operation may be changed without the necessity of changing the punching mechanism for the corresponding encoding operation.

Although with the exception of the embodiment shown in FIGS. 1 and 2, all other embodiments are shown with non-flared cavities (14, 18, 19 and 21), it is to be understood that any of the record cards 1*a*—1*e* may be prepared with outwardly flaring cavities. In addition to the sensor guiding feature referred to hereinbefore in connection with the encoding of the record card 1, the flared configuration of the cavities is convenient when, for correcting or complementing purposes, projecting plugs are to be inserted through these cavities to replace the original projections that have been punched out.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

I claim:

1. A record card comprising:

A. a plurality of spaced, individual projections rising from a face of said card and forming a plurality of parallel extending spaced rows, each projection having a base contour lying in the plane of said face, said projections being selectively removable to obtain a record card with encoded data thereon adapted to be sensed and B. a plurality of spaced, individual, juxtaposed, outwardly open cavities provided in said card, each of said cavities being associated with a projection and disposed on that face of said card which is reverse with respect to the first-named face from which the associated projection rises; each cavity having a solid base disposed spaced from said plane in a direction away from the associated projection, the outline of said solid base being aligned with and in configuration identical to said base contour of the last-named projection; each cavity providing a portion of reduced thickness of said card to facilitate removal of the associated projection from said card; each cavity being outwardly flared to the adapted to aid in guiding a punch member for removing projections and to be adapted to receive a plug for replacing an original, removed projection for correcting purposes.

2. A record card as defined in claim 1, wherein said cavities are outwardly flared.

3. A record card as defined in claim 1, wherein said projections are rigid and are provided with at least one cam face for cooperating with said sensor head.

4. A record card as defined in claim 1, wherein said projections are elastically deformable to form a cam face cooperating with said sensor head by yielding resiliently thereto upon contact therewith.

5. A record card as defined in claim 1, wherein both sides of said card are provided both with projections and cavities, said projections and cavities are arranged alternatingly on each of said faces.

6. A record card as defined in claim 3 including inserts adapted to be attached to adjacent projections for filling out the space therebetween.

7. A record card as defined in claim 3 including a series of intermediate projections alternating in each row with said cam-faced projections and being of substantially equal height therewith, a cavity associated with each said intermediate projection and disposed on that face of said card that carries the cavities associated with said cam-faced projections.

8. A record card as defined in claim 1, wherein said projections in each of said rows are staggered with respect to the projections in an adjacent row.